United States Patent [19]
Baugh

[11] 4,041,719
[45] Aug. 16, 1977

[54] METHOD AND APPARATUS FOR CONNECTING SUBMARINE PIPELINES

[75] Inventor: Benton F. Baugh, Houston, Tex.

[73] Assignee: Vetco Offshore Industries, Inc.

[21] Appl. No.: 678,147

[22] Filed: Apr. 19, 1976

[51] Int. Cl.² .............................................. F16L 1/00
[52] U.S. Cl. .................................. 61/110; 61/69 R
[58] Field of Search ............... 61/72.3, 72.1, 69 R, 61/110, 111, 107

[56] References Cited

U.S. PATENT DOCUMENTS

| 3,434,295 | 3/1969 | Manning | 61/72.3 |
| 3,566,609 | 3/1971 | Smith | 61/72.3 |
| 3,795,115 | 3/1974 | Bergquist et al. | 61/72.3 |

FOREIGN PATENT DOCUMENTS 1,246,266  10/1960  France ................................. 61/72.3

Primary Examiner—Jacob Shapiro
Attorney, Agent, or Firm—Pravel, Wilson & Gambrell

[57] ABSTRACT

A new and improved method and apparatus for transporting, laying and connecting flowlines to subsea structures, such as wellheads on the ocean bottom wherein a submersible marine propulsion apparatus is used to tow a buoyed flowline to its desired location and underwater flowline connectors are used to connect the flowline to a wellhead or the structure. During the transporting and laying of the line, the flowline is supported by a series of spaced adjustable buoys which support the flowline at a desired depth beneath the surface and which can be remotely actuated to lower the flowline to the ocean floor.

1 Claim, 4 Drawing Figures

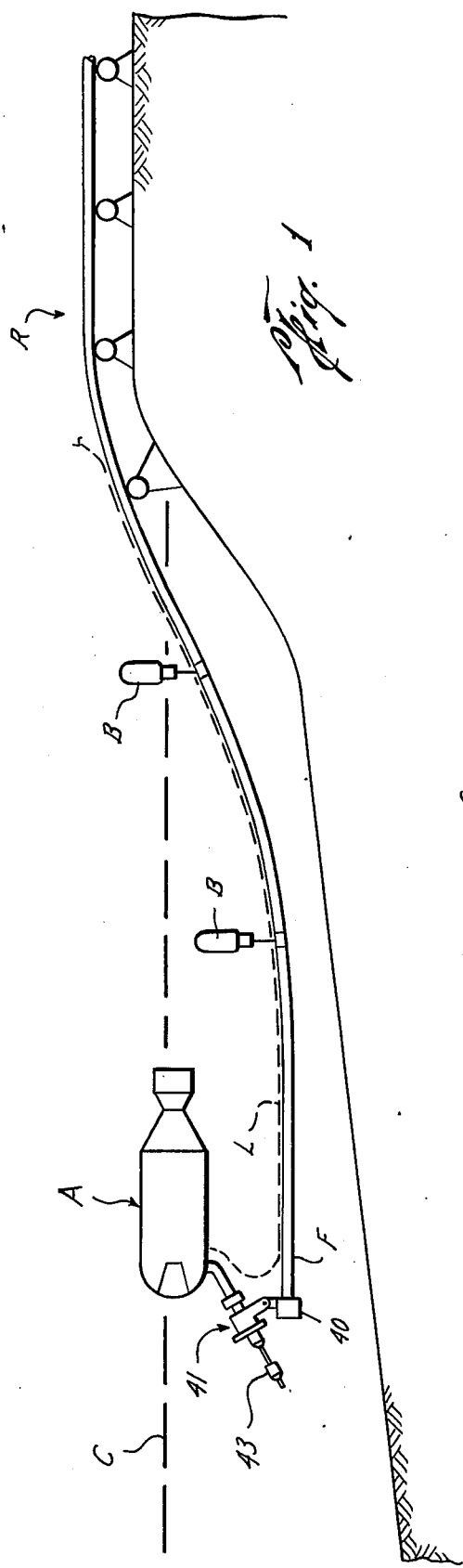
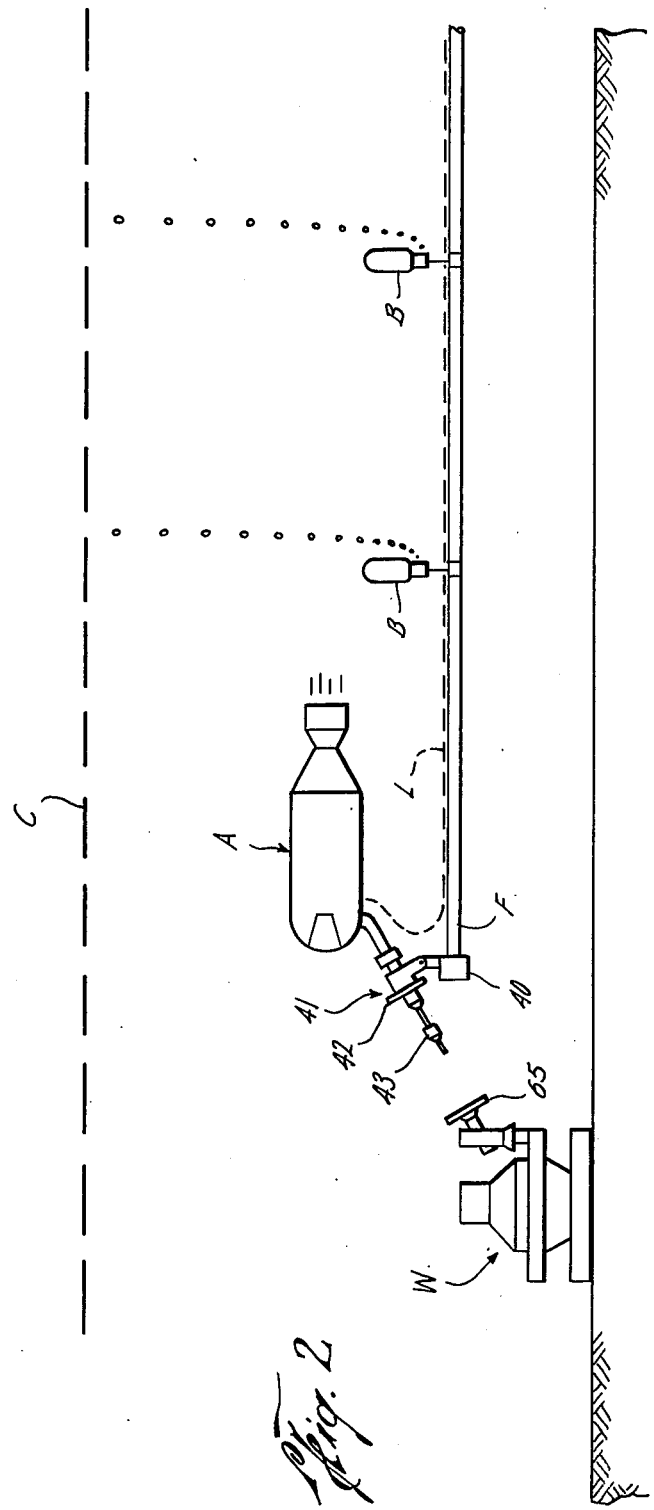

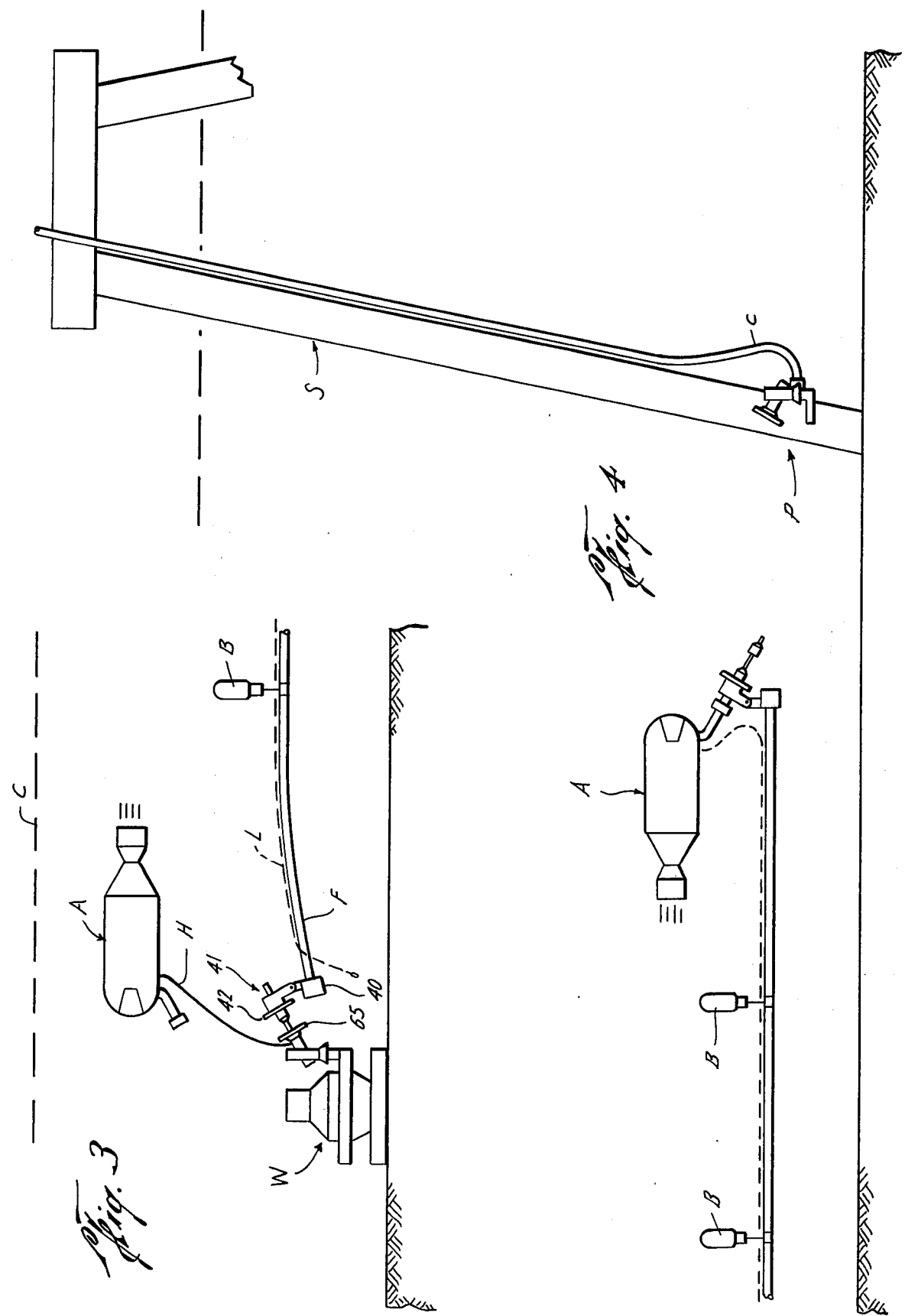

METHOD AND APPARATUS FOR CONNECTING SUBMARINE PIPELINES

BACKGROUND OF THE INVENTION

Although methods for laying and connecting flowlines to subsea wellheads and offshore platforms have been successfully demonstrated, such as vertical and pull-in type flowline connections, the requisite equipment renders such methods very expensive even in relatively shallow waters. The indications are that deepwater systems will be even more expensive and it is, therefore, an object of the present invention to provide a new method and apparatus for laying and connecting submerged flowlines to offshore wells.

SUMMARY OF THE INVENTION

The present invention provides a method and apparatus for transporting, laying and connecting flowlines to submerged wellheads or trees, offshore platforms or other structures in relatively deep or shallow waters and either in rough or calm weather. A marine vessel capable of submerged operation, such as manufactured by Bendix Corporation, is used to pull or tow the flowline bundle, which may consist of a plurality of flowlines strapped or otherwise secured together, or a single line, from an assembly facility on shore to a selected offshore site. In deep water operations the submersible vessel will operate beneath the surface a sufficient depth to avoid the forces of wave motion or other surface disturbances. The flowlines will be pre-welded, pre-tested and connected together in sections at the water's edge and then pulled to the desired location. The flowlines will be carried by a plurality of adjustable buoys which may, by remote control, be submerged to and/or raised from a desired depth. With buoys of this type, the flowline is positioned at a desired depth beneath the surface while being towed into position and aligned for connection. As the submergible vessel approaches the wellhead to which the flowline is to be connected, signals are sent to the adjustable buoys to adjust their ballast and cause the flowline to descend to the desired depth. Once the end connection is made, the adjustable buoys lower the flowline into position on the ocean bottom and are then released and retrieved.

The submergible vessel is equipped with a connecting apparatus, such as the single line connector disclosed in U.S. Pat. No. 3,866,677, issued Feb. 18, 1975. Thereafter, the submergible vessel can, if desired, return to the other end of the flowline, cause the adjustable buoys to lift the other end of the flowline for installing a flowline connector and then connect the line to a platform or other structure in the same manner as the first end of the flowline was connected.

BRIEF DESCRIPTION OF THE DRAWINGS

FIG. 1 is a schematic view showing a submersible vessel towing a buoyed flowline from an onshore makeup facility seawards;

FIG. 2 is another schematic illustration showing the submersible vessel with a flowline submerged near the ocean floor approaching an underwater connector;

FIG. 3 is a schematic illustration showing a submersible vessel connecting such flowline connector to an underwater connector; and FIG. 4 is a schematic illustration showing the submersible vessel connecting the other end of the flowline to an underwater connector at a platform.

DESCRIPTION OF THE PREFERRED EMBODIMENT

The method and apparatus of the present invention, as illustrated schematically in the drawings, includes a submersible marine propulsion and guidance vessel which is designated A in the drawings. Such propulsion device is a submarine-type vessel which is capable of selectively operating on either the surface of the ocean or water body or in a submerged position, as desired. It will be appreciated that it will be driven by any convenient means, such as jet propulsion, propellers or the like and can tow and guide a relatively long length of flowline from the onshore fabrication facility to a remote subsea destination.

Such propulsion device is shown connected to an outward end of a flowline F which is made up of pre-welded sections that are pre-tested onshore. These sections can be either single line or a bundle of flowlines strapped or otherwise secured together. A roller system, designated generally R, may be provided to facilitate assembling or making up the flowline F as it is being pulled seaward by the vessel A. However, it will be appreciated that a water-filled canal could be provided at the ocean's edge for receiving the pre-made up sections of the flowline which would be supported by the adjustable buoys when towed seaward by the vessel A.

The buoys B are of a submersible adjustable ballast type which are capable of being submerged at a desired depth beneath the surface C and maintained at that depth or raised or lowered as desired by remote control. Such buoys are shown and described in my co-pending patent application "Subsurface Adjustable Buoy", Ser. No. 671,276, filed Mar. 29, 1976. The dotted line L is a control line for remotely controlling the depth at which the adjustable buoys are submerged. Such buoys remain at the desired depth according to the signal received from the control line.

The submerged vessel A tows the submerged flowline F to an offshore location for connection to a remote submerged wellhead W with all of the adjustable buoys supporting the flowline submerged to the same depth, i.e., 100 feet, or such other depth that is sufficiently beneath the surface C to avoid wave action right above the ocean bottom. As the vessel A approaches the subsea christmas tree or wellhead W, a signal is sent along the control line L to cause the submerged buoys B to descend to lower the flowline F to the approximate depth of the wellhead or tree W.

With the present invention, the underwater connection between the flowline F and the christmas tree or wellhead W may be made with an underwater connection apparatus of the type shown and described in my U.S. Pat. No. 3,866,677, issued Feb. 18, 1975, for "Underwater Connection Apparatus". For convenience, the same numbers will be used in this application to identify the same or similar parts as are disclosed in my U.S. Pat. No. 3,866,677.

As shown schematically in the drawings, the flowline F is provided with a flowline flange 40 for connecting to a suitable corresponding flange on the christmas tree or wellhead structure W. The flowline flange 40 is releasably connected to a flowline carrier assembly 41 which is carried by the submersible vessel A. The carrier assembly 41 has a probe 43 which may be manipulated and stabbed into the funnel 65 which may be actuated to guide the flowline flange 40 into its mating flange (not shown) on the wellhead W.

After the submarine has inserted the probe 43 into the funnel 65, it then signals the wellhead to actuate the apparatus to complete the connection of the flowline flange 40 to the wellhead. This may be done by sonar or by the submarine picking up a hydraulic control line H and actuating the controls locally or by some other suitable control means.

Specifically, the flowline stroking cylinders on the wellhead are actuated to pull the landing flange assembly 42 into the funnel 65 and thereafter pivot cylinders are actuated to land the flowline in the alignment channel. The blanking flange is removed and the flowline is stroked forward, connected to its mating flange, and tested substantially as described in U.S. Pat. No. 3,866,677. Thereafter, the submarine signals the adjustable buoys to lower the flowline F to the ocean floor.

The submarine then releases the carrier assembly 41 and moves to the opposite end of the flowline F.

As shown in FIG. 4, a flowline pulling tool P has been landed on a suitable conduit C at the base of the platform or other structure S. The submarine locks onto a flowline carrier 41 attached to the opposite end of the flowline F from the wellhead W. The submarine signals the buoys supporting the end of the flowline to raise the end of the flowline to a working elevation off of the bottom suitable for connection to the pulling tool P on the platform S. The submarine then moves in and makes the connection of the second end of the flowline to the platform the same way it connected the other end of the flowline F to the wellhead W. It will be appreciated that the entire operation of pulling the flowline into place and connecting its ends to the wellhead and platform could be accomplished with the submerged vessel remaining submerged throughout the operation.

The foregoing disclosure and description of the invention are illustrative and explanatory thereof, and various changes in the size, shape, and materials as well as in the details of the illustrated construction may be made without departing from the spirit and scope of the invention.

I claim:

1. A method of laying a pipeline on an offshore water bottom, comprising the steps of:
   a. connecting lengths of line pipe end-to-end onshore to form a partial segment of the pipeline;
   b. securing one end of such partial segment to a submersible power vessel;
   c. connecting remotely actuatable submersible buoys to said segment for supporting it either at the water surface or at some desired depth beneath the surface;
   d. connection additional lengths of pipe to the partial segment at the shore end to form a continuous pipeline until the desired length is reached;
   e. connection additional remotely actuatable buoys to said pipeline segment to support the additional lengths of line pipe as needed;
   f. submerging the pipeline beneath the water surface;
   g. towing the submerged pipeline into position offshore with the submersible vessel;
   h. submerging said pipeline and said submersible vessel to a position near the bottom of the water body;
   i. guiding the offshore end of the pipeline segment with the submersible vessel to connect such offshore end with a pre-existing pipeline connection apparatus near the water bottom;
   j. submerging the pipeline to the bottom; and
   k. releasing the pipeline from the remotely actuatable buoys.

* * * * *